United States Patent Office 3,699,065
Patented Oct. 17, 1972

3,699,065
WATER-SOLUBLE ALKYD RESIN COMPOSITIONS
Edgar L. Clark, Fredericksburg, Va., assignor to Commercial Solvent Corporation
No Drawing. Filed Mar. 4, 1971, Ser. No. 121,160
Int. Cl. C09d 3/64, 3/66, 5/24
U.S. Cl. 260—22 R   10 Claims

ABSTRACT OF THE DISCLOSURE

A water-soluble alkyd resin composition and a 2-step process for the preparation thereof comprising the product of the reaction of an aliphatic monocarboxylic acid with di- or tripentaerythritol, which product is then reacted with phthalic anhydride to an acid number of 70-100, then neutralized. The composition is useful in the formulation of protective coatings, especially those intended for application by the electro-deposition process.

BACKGROUND OF THE INVENTION

This invention relates to alkyd resin compositions. In a particular aspect it relates to water-soluble alkyd resin compositions having utility in protective coatings.

It is known that alkyds which can be solubilized in water by addition of a base can be prepared by shortening the normal reaction period thereby producing resins having a high acid number. A conventional glyceryl phthalate alkyd prepared in this manner is unsatisfactory, however, because it is a mixture containing many small molecular fragments which dry poorly and hydrolyze easily. For this reason, maleic or fumaric oil adducts, i.e. the reaction product of a drying oil with maleic or fumaric acid or anhydride, are used instead of phthalic alkyds for water soluble finishes. These oil adducts are fairly large molecules free from small, undesirable fragmentary molecules in the mixture. Although they have been quite successful in coatings intended for indoor use, they are unfortunately, inferior to phthalic alkyds in weathering properties. Accordingly a need exists for products having good weathering properties, suitable for outdoor exposure.

SUMMARY OF THE INVENTION

It is an object of this invention to provide alkyd resin compositions.

It is another object of this invention to provide water-soluble alkyd resin compositions and a process for the production thereof.

Other objects will be apparent to those skilled in the art from the disclosure herein.

It is the discovery of the present invention to provide a water-soluble alkyd resin composition and a process for the preparation. The resin is the product of the reaction of an aliphatic monocarboxylic acid, or mixture thereof, with di- or tripentaerythritol or mixture thereof, which product is then reacted with phthalic anhydride and heated until an acid number of 70-100 is obtained. An excess of carboxyl groups with respect to hydroxy groups is provided, thereby forming an acidic composition which can then be neutralized with a suitable alkaline material, thereby rendering the composition water-soluble.

DETAILED DISCUSSION

The resinous compositions of this invention are prepared by reacting di- or tripentaerythritol, or a mixture thereof, as hereinbefore set forth, with an aliphatic monocarboxylic acid, i.e. a saturated or unsaturated fatty acid of from 9-20 carbon atoms, or a mixture thereof, in an equivalent weight ratio of about 2-3 of the polyol to about 1 of acid, preferably about 2.5-3.0:1. The reaction is conducted at elevated temperatures, e.g. from about 450-500° F., under an oxygen-free, inert atmosphere.

The reaction is monitored by periodically determining the acid number by known methods. When it is below about 5, the reaction is regarded as being substantially complete and the mixture is permitted to cool to below about 400° F. About half of the available hydroxy groups are converted to esters in this step.

Phthalic anhydride, in an equivalent weight ratio of from about 2.0-2.3:1 of the acid, preferably about 2.1-2.2, is added. The addition results in considerable cooling, so the mixture is heated to about 350-360° F. until the acid number is below about 100, preferably within about 70-90. The mixture is then permitted to cool, e.g. to below about 150° F., and sufficient isobutyl alcohol is added to provide a solids content of about 75% by weight.

Phthalic acid canont be satisfactorily substituted for phthalic anhydride in the foregoing step. A higher temperature would be required to effect a reaction with phthalic acid and the resulting product at desired acid value would, it is believed, be a heterogeneous mixture of half esters, diesters, and free-floating unreacted phthalic acid molecules. By contrast, phthalic anhydride reacts at a low reaction temperature forming, it is believed, phthalic half esters attached to the residual hydroxy groups on the di- or tripentaerythritol fatty acid esters formed in the first step.

The material prepared by the foregoing process is suitable for storage as is, but prior to formulating into a protective coating, it is neutralized by known methods with a suitable alkaline material, e.g. an amine or alkanolamine in the presence of water. The aqueous composition is then ready for final formulation and use. It is particularly useful in coating compositions intended for application to metal articles by the electrodeposition process, followed by baking, as is known in the art.

The polyols suitable for the practice of this invention are limited to dipentaerythritol and tripentaerythritol or mixtures thereof. These polyols are commercially available and the usual commercial grades are suitable for the practice of this invention. Other polyols have been found to yield resinous compositions of inferior quality and unsuitable for use.

o-Phthalic anhydride is commercially available and the usual commercial grade is suitable for the practice of this invention. The alkyl and alkenyl acids suitable for preparing these compositions include the unsaturated fatty acids of from 12 to 22 carbon atoms, or mixtures thereof. The preferred alkenyl acids are linoleic, linolenic or oleic acids, or mixtures thereof, such as linseed fatty acids and fish oil acids, e.g. behenic. A particularly preferred unsaturated fatty acid mixture is the product denoted by those skilled in the art as "tall oil" fatty acids, a by-product of paper manufacture. In addition to unsaturated fatty acids, this product also contains small percentages of palmitic and stearic acids. The grade known in the art as "4% rosin" is preferred.

Alkyl acids include pelargonic, lauric, palmitic, and stearic. Pelargonic is a preferred alkyl acid. The alkyl or alkenyl acids are employed in a ratio of about one equivalent to 2-3 of the polyol, and about 1 to 2.1-2.2 equivalents of phthalic anhydride.

The term "equivalents" as used herein is intended to have the usual meaning. It is synonymous with equivalent weight and combining weight.

The alkaline materials, amines and alkanolamines, used to neutralize the acidic resins are known in the art. They include but are not limited to inorganic alkalis, ammonia, 2-amino-2-methyl-1,3-propanediol and 2-amino-2-ethyl- 1,3-propanediol, tris(hydroxymethyl)aminomethane, ethanolamine, diethylamine, dimethylaminoethanol, and others. It is not intended that the invention be limited to any particular neutralization agent nor method of neutralization. Generally, however, alkanolamines are preferred. Selection of a suitable amine or alkanolamine and its use to neutralize the resin can be accomplished by any suitable method many of which are known.

The invention will be better understood, with reference to the following examples. It is understood, however, that the examples are intended for illustration only and it is not intended that the invention be limited thereby.

EXAMPLE 1

To a 5-liter flask equipped with an agitator, a gas inlet tube and a heating means was delivered 1563 g. (5.6 equivalents) of distilled tall oil fatty acids and 702 g. (15.6 equivalents) of dipentaerythritol. The mixture was heated with agitation to 470° F. while passing nitrogen through the gas inlet. The acid number was determined periodically and when it was below 5, heating was discontinued and the contents allowed to cool to below 400 °F. Phthalic anhydride, 864 g. (11.7 equivalents) was added and the mixture was heated at 350–360 °until the acid number was 90–95. It was then diluted with sufficient isobutyl alcohol to provide a solution containing 75% by weight resin.

A portion of the resin solution, 1200 g., was diluted with water, 210 g. and neutralized with dimethylethanolamine, 40 g. This concentrated solution had a viscosity of J and a color of 7. The non-volatile content was 65%.

The foregoing solution was diluted with an equal weight of water, and 15% (based on the solids content) of Resimine 740 melamine resin made by Monsanto Chemical Co. was added. A film was cast by electrodeposition by known methods on a steel panel and baked at 300° for 30 minutes. The resulting finish was very hard and tough; when tested in a weatherometer it exhibits excellent weather resistance.

EXAMPLE 2

The experiment of Example 1 was repeated in all essential details except that the following ingredients were used:

|  | G. | Equivalents |
| --- | --- | --- |
| Pelargonic acid | 906 | 5.7 |
| Dipentaerythritol | 780 | 17.3 |
| Phthalic anhydride | 914 | 12.33 |

After dilution with isobutyl alcohol, the resin solution had the following properties:

Viscosity _____ $Z_2$
Color _____ 8
Acid number _____ 81.9
Percent non-volatile _____ 65.2

A 600 g. portion of the foregoing resin solution was mixed with water, 800 g., and dimethylethanolamine, 54 g., to form a resin solution containing 50% by weight of solids. To 4 parts by weight of solids of this solution was added one part by weight of solids of a water-dispersible melamine resin (Resimine 740, manufactured by Monsanto Chemical Co., St. Louis, Mo.).

The foregoing solution can be readily formulated into a white baking enamel by adding suitable pigments, e.g. titanium dioxide, and other desired additives as is known. These enamels can be thinned with water and applied to a substratum, e.g. a metal article by electrodeposition or spraying, then baked at about 300° F. to form a hard, durable finish characterized by excellent gloss and color retention.

EXAMPLES 3A AND 3B

The experiment of Example 1 was repeated in all essential details except that a mixture of linseed fatty acids was substituted for tall oil acids. As is known, linseed fatty acids consist largely of linoleic, linolenic, oleic and stearic acids. The quantities used and the properties of the resin solution are as follows:

|  | A | | B | |
| --- | --- | --- | --- | --- |
|  | Weight, g. | Equivalents | Weight, g. | Equivalents |
| Acid | 2,110 | 7.55 | 1,563 | 5.58 |
| Dipentaerythritol | 792 | 17.6 | 702 | 15.6 |
| Phthalic anhydride | 1,248 | 16.9 | 864 | 11.7 |
| Viscosity, Gardner | V+ |  | R |  |
| Color | 11+ |  | 6+ |  |
| Acid number | 97.7 |  | 91.6 |  |
| Percent non-volatile | 82 |  | 77 |  |

These resins were neutralized with triethylamine; diluted with water to 40% non-volatile matter, and 0.05% cobalt drier was added. A steel panel was coated by electrodeposition with a film which air-dried in a few hours to a hard finish. When tested in an accelerated weathering tester, these resin films exhibit excellent weather resistance.

EXAMPLE 4

The experiment of Example 1 is repeated in all essential details except that an equivalent amount of tripentaerythritol is substituted for dipentaerythritol. The water-soluble resin thereby obtained is useful in formulating water-based baking enamels. When tested in an accelerated weathering tester, the baked enamel exhibits excellent weather resistance.

I claim:
1. A water-soluble, alkyd resin composition comprising the neutralized reaction product of about 2–3 equivalents of dipentaerythritol or tripentaerythritol, or a mixture thereof, with about 1 equivalent of an aliphatic monocarboxylic acid having from 9 to 20 carbon atoms, or a mixture thereof, and about 2.0–2.3 equivalents of phthalic anhydride.
2. The composition of claim 1 wherein said aliphatic monocarboxylic acid is an alkyl acid.
3. The composition of claim 2 wherein said alkyl acid is pelargonic acid.
4. The composition of claim 1 wherein said aliphatic monocarboxylic acid is an alkenyl acid.
5. The composition of claim 1 wherein said alkenyl acid is provided by tall oil acids.
6. The composition of claim 1 wherein said acid is a mixture of linolenic, linoleic, oleic and stearic acids.
7. The composition of claim 1 wherein said polyol is dipentaerythritol.
8. The composition of claim 1 wherein said polyol is tripentaerythritol.
9. A method for the preparation of a water-soluble, alkyd resin composition comprising the steps of
   (a) heating a reaction mixture consisting of about 2–3 equivalents of dipentaerythritol or tripentaerythritol or a mixture thereof, and about 1 equivalent of an aliphatic monocarboxylic acid having from 9 to 20 carbon atoms, or a mixture thereof, at a temperature of about 450 to 500° F. in the presence of an inert atmosphere until the acid number is about 5 or less.
   (b) adding about 2.1 to 2.2 equivalents of phthalic anhydride and heating at a temperature of about 350 to 360° F. until the acid number is within the range of 70 to about 100, and
   (c) cooling said reaction mixture and dissolving and neutralizing in water containing a neutralizing agent.

10. The process of claim 9 wherein said dipentaerythritol or tripentaerythritol are reacted with said acid in an equivalency of about 2.5–3:1.

References Cited

UNITED STATES PATENTS

| | | | |
|---|---|---|---|
| 3,379,548 | 4/1968 | Jen | 260—22 |
| 3,444,105 | 5/1969 | West et al. | 260—2.5 |
| 2,945,830 | 7/1960 | Kraft | 260—22 |
| 2,954,354 | 9/1960 | Young | 260—22 |
| 3,226,348 | 12/1965 | Purcell et al. | 260—22 |
| 3,332,898 | 7/1967 | Kloos | 260—22 |
| 3,376,241 | 4/1968 | Que | 260—20 |

DONALD E. CZAJA, Primary Examiner

R. W. GRIFFIN, Assistant Examiner

U.S. Cl. X.R.

117—132 R, 161 K; 204—181; 260—21, 22 R, 29.2 E, 29.2 N, 32.6 R, 33.4 R

PO-1050
(5/69)

UNITED STATES PATENT OFFICE
CERTIFICATE OF CORRECTION

Patent No. 3,699,065             Dated October 17, 1972

Inventor(s) Edgar L. Clark

It is certified that error appears in the above-identified patent and that said Letters Patent are hereby corrected as shown below:

Column 2, line 19 "canont" should be --cannot--

Column 3, line 49 "12.33" should be --12.31--

Signed and sealed this 22nd day of May 1973.

(SEAL)
Attest:

EDWARD M. FLETCHER, JR.
Attesting Officer

ROBERT GOTTSCHALK
Commissioner of Patents